Sept. 11, 1945.  W. B. ZIMMERMAN ET AL  2,384,517
AUTOMATIC WELDING VISOR SHUTTER
Filed April 13, 1942
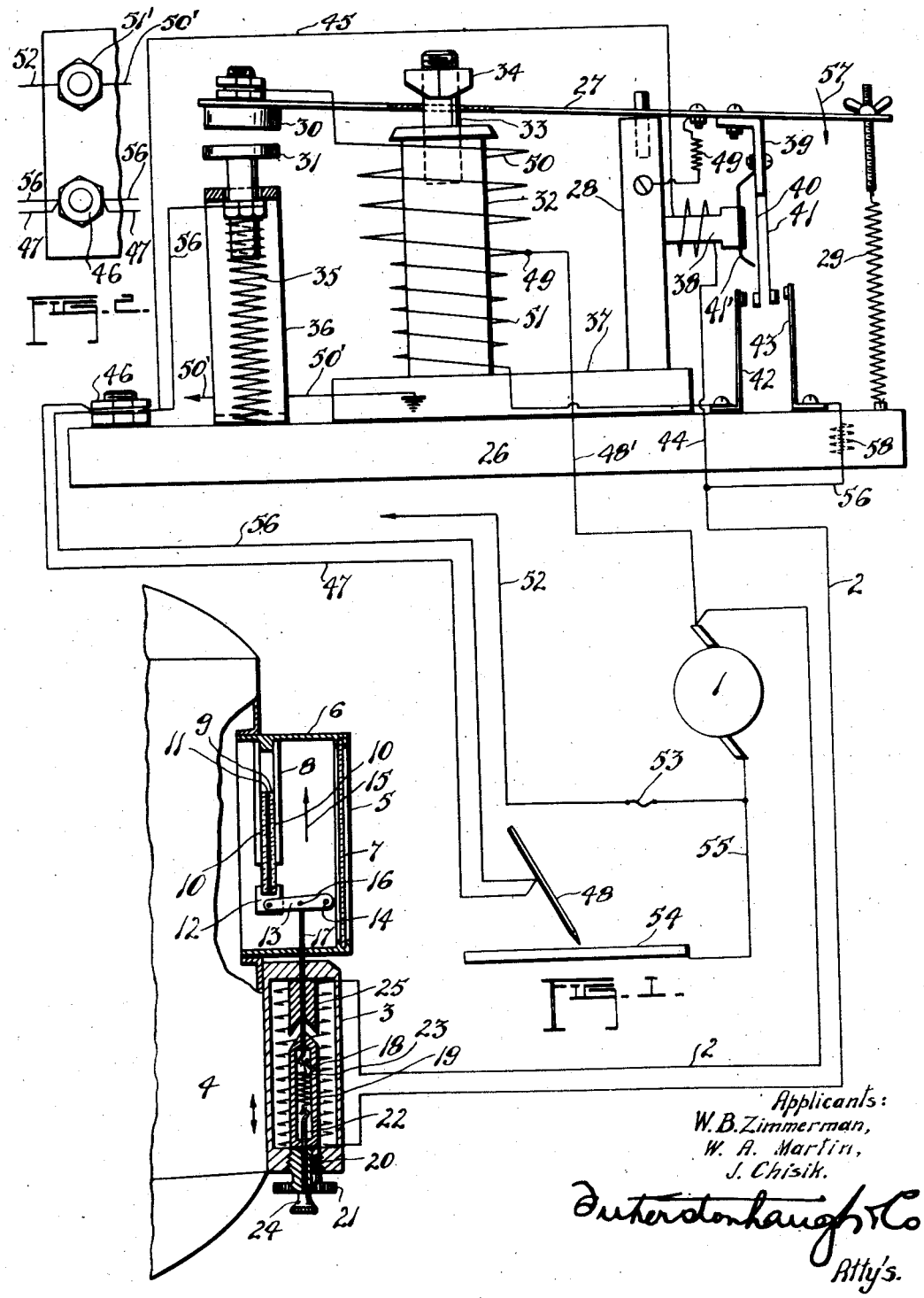
Applicants:
W. B. Zimmerman,
W. A. Martin,
J. Chisik.

Patented Sept. 11, 1945

2,384,517

UNITED STATES PATENT OFFICE 2,384,517

AUTOMATIC WELDING VISOR SHUTTER

Walter B. Zimmerman, William A. Martin, and Joseph Chisik, Winnipeg, Manitoba, Canada Application April 13, 1942, Serial No. 438,700

5 Claims. (Cl. 2—8)

Our invention relates to arc welding visor shutters capable of being operated automatically by the passage of a current through a solenoid adjacent the shutter upon the application of a welding electrode to a welding table or onto a piece of work.

A further object of our invention is to provide a device of the character herewithin described by the use of which, both hands of the operator are left free so that he is not obliged periodically to open his shutter manually to view the work and then manually close it again prior to striking an arc.

A further object of our invention is to provide a device of the character herewithin described by the use of which a considerable saving of time will become possible and, as a consequence, a greater output per hour, per man will be possible.

A further object of our invention is to provide a device of the character herewithin described whereby the manual dexterity or ability of the operator will be materially increased by virtue of his being able to keep both hands free for his work.

A further object of our invention is to provide a device of the character herewithin described by the use of which eye injuries will be avoided through the accidental exposure of the naked eye to a welding arc.

A further object of our invention is to provide a device of the character herewithin described which is positive in action, of eminently simplified construction, and which therefore cannot readily become out of order.

With the above more important objects in view and such other minor objects as may appear as the specification proceeds, our invention consists essentially in the arrangement and construction of parts all as hereinafter more particularly described, reference being had to the accompanying drawing, in which:

Figure 1 is a wiring diagram of our retarding relay, showing also a portion of a welding visor equipped with our invention and electrical means for operating the same.

Figure 2 is a plan detail of our welding electrode terminal and ground terminal.

In the drawing like characters of reference indicate corresponding parts in the different figures.

Our invention consists primarily of (1) a shutter assembly in the welding hood, and (2) a relay, and proceeding to describe first our shutter assembly, it will be seen that a direct current generator 1 conveys current through a "shutter circuit" 2 to the shutter solenoid 3 mounted on a welding visor or hood 4. Above the solenoid 3 is our shutter collectively enumerated 5, the same consisting of a rectangular housing 6 faced with transparent glass 7 and having, upon the side walls thereof a pair of parallel tracks or guides 8 in which the actual glass shutter 9 moves.

The shutter 9 may consist of a piece of glass such as is employed to shield the eyes of welders according to conventional practice or it may consist of a very thin sheet of a sufficiently dark glass, or of "Polaroid" film interposed between two sheets of mica 10 for instance as I have indicated at 11. The shutter may be framed on all sides, or may be framed on the lower side only by means of the channel 12 to which we freely secure the lever 13.

This lever of the third order is fulcrumed or pivoted at the point 14 while the effort is applied longitudinally as indicated by the arrow 15 at the point 16 by means of the rod or link 17. The rod 17 extends longitudinally within the solenoid 3 and terminates in the hook or eye 18 within the core 19 of the solenoid, the lower end of the rod being secured in the upper end of the core 19 so that it may be moved longitudinally therewith and thereby.

A screw threaded boss 20 having a knurled finger disc 21 is threadably secured in the base of the solenoid 3, the lower end of the core 19 abutting the upper, inner end of the boss which is drilled concentrically to receive the link 22. The link 22 is also provided, similarly to the link 17, with an eye, a light coil spring 23 being interposed between the two links and connected at its ends thereto.

The lower end of the link 22 is screw threaded to receive the knurled finger disc 24, while the link 17 extends freely and concentrically through the longitudinal drilling in the portion 25, being secured only within the upper end of the core 19 as already described. It will therefore be obvious that the tension or downward effort which the spring 23 exerts upon the lever 13, will depend upon the tension thereof as governed by the finger piece 24. It will also be recognized that adjustment of the finger disc 21 will operate to move the end shiftable core 19 closer to or further away from the portion 25 so that the linear distance travelled by the shutter may be varied according as to whether the wearer of the hood or visor prefers a wide rectangular aperture through which to view his work when the shutter is down or a wide aperture.

Our relay is mounted upon the insulating blocks 26 and consists of the parts which we will now enumerate and describe.

An armature 27 is pivotally mounted for tilting or reciprocating movement upon the top of the vertical support 28, the armature 27 being biased by the spring 29 at one end thereof while a contact 30 at the opposite end of the armature is capable of making contact with the buffered contact 31 when the primary solenoid 32 is energized. We describe the parts 27, 29 and 30 as a circuit breaker and it will be seen that the core 33 of the primary solenoid 32 projects through an aperture in the armature 27, terminating in a screw threaded portion engaged by the nut 34 by means of which the setting or spacing of the contacts 30 and 31 may be adjusted. The contact 31 is buffered by the coil spring 35 and may be supported by a yoke such as 36 wherein the spring 35 would be positioned within the open central portion.

The solenoid 32 is mounted upon a bed plate 37, a support 28 being positioned on the plate, both plate and support are of iron or some other magnetic or current carrying material and projecting from the support 28 is our initial solenoid or coil 38. Secured to the underside of the armature 27 and projecting downwardly is an angle bracket 39 to the end of which are secured two spaced leaf spring contacts 40 and 41.

A contact breaking element 41' may be provided where the leaf spring of the contact 40 is very resilient or of considerable length and may be in the form of a yoke of which the two arms would span the head of the solenoid 38.

The contacts 42 and 43 are mounted on the plates 26 and are capable of being engaged by the contacts 40 and 41, a pilot circuit 44 extending around the solenoid 38, through the lead 45 down to the terminal 46 and from thence through the lead 47 to the welding electrode 48.

It will be seen that the pilot circuit 44 is in series with the circuit 2. However, we also provide what we call a primary circuit 48' leading from the generator 1 in parallel with the circuits 2 and 44 to the primary electrode 32, being tapped off at the point 49 into the welding voltage circuit 50 which extends round the upper part of the solenoid 32 and an armature closing circuit 51 which extends round the lower part of the solenoid 32 and proceeds to the contact 42.

It will be seen that the armature 27 is grounded by means of the lead 49 to the support 28 and the bed plate 37 from which a ground lead 50' extends to the terminal 51', from which, in turn, a negative lead 52 (Figures 1 and 2) returns to the generator 1, being interrupted for safety by the fuse 53. The table 54 (or it may be a piece of work being welded) is similarly grounded to the generator by means of the lead 55 in which may also be inserted a fuse if desired.

Immediately the operator applies the electrode 48 to the table or to a grounded piece of work, current flows through the shutter circuit 2, lifting the core 19 and closing the shutter so that the operator can only view the work through the protective glass forming the same. The current also travels in series through the solenoid 38 or the pilot circuit which we have described. This energizes the solenoid 38 so that the contact 40 swings to the left and makes with the contact 42. Current may now travel in parallel through the primary circuit 48', the armature closing circuit 51, through the contacts 42 and 40 and from thence to ground via the connection 49. The circuit 51 energises the solenoid 32 so that the armature 27 is drawn downwardly against the resistance of the spring 29 into contact with the buffered contact 31.

Before contact is made however between the contacts 30 and 31, contacts 41 and 43 will engage as a result of the movement of the armature 27 so that current may now travel through the shunt 56 and through the contacts 43 and 41. When such contact has been made, contacts 42 and 40 will break, if necessary, being assisted in breaking by the member 41', the rigidity of which will force the leaf spring 40 away from the contact 42.

Not until engagement has been effected between the contacts 41 and 43 will the contact 40 break away from the contact 42, and so, for an inconsiderable period of time, current will be travelling in parallel through the pair of contacts 42 and 40 as well as through the pair of contacts 43 and 41, and during this inconsiderable period of time, the downward movement of the armature 27 will not be completed until a circuit is completed between the contacts 30 and 31.

As soon as the welding voltage circuit 50 is completed by the engagement of the contacts 30 and 31, an arc will be established between the point of the electrode 48 and the work but by this time, our shutter will be well and truly closed to protect the operator's eyes. It is necessary however that current shall continue to flow through the shutter circuit 2. The same is therefore uninterrupted during the arc welding process.

The lead which carries the welding current from the contact 31 to the electrode 48 is designated 56 and, it will be noted, extends in parallel with the lead 47 which carries the pilot circuit. However, it is not essential that two sets of leads be provided from the terminal 46 to the electrode 48, these two being shown in the accompanying Figure 1 merely for clarity.

When the arc is broken between the electrode 48 and the table 54 or a piece of grounded work, it is important that our shutter 9 shall not open until the harmful radiation from the arc is dissipated. We would therefore explain that although current ceases to travel through the pilot circuit 44 including the leads 45 and 47 immediately the electrode 48 and the table or work are separated, and although the contacts 30 and 31 commence to move apart immediately, the shutter circuit 2 is not broken immediately.

This is because the contacts 41 and 43 will not separate and become insulated from each other by an air gap immediately the armature commences to move under the influence of the spring 29 in the direction of the arrow 57, the leaf spring of the contact 41 being designed to dwell for a short period in engagement with the contact 43 before separation takes place. Accordingly, a gap will not commence to appear between the contacts 41 and 43 until (by way of arbitrary example) one half of the maximum gap has appeared between the contacts 30 and 31.

It follows that as long as the contacts 41 and 43 are in engagement, current to complete a shutter circuit may be shunted through the leads 56, the contacts 43 and 41, through the connection 49 to be grounded on the support 28. In instances where a voltage drop does not occur, we may insert a resistance 58 in the shunt 56, but there will not be many cases where the same is necessary according to our experience.

In conclusion with the embodiment of our invention above described, we would explain that the solenoid 3 may be designed to operate on 20 volts while the solenoid 38 might operate on 30 volts. As the solenoids 3 and 38 are in series during the operation of establishing welding contact, directly across the open circuit welding generator voltage of about 60 or 70 volts, quick and positive action is assured as to the operation of these two solenoids. It will naturally be understood however that in no sense do we intend to imply by this statement that we are confined to solenoids or other equipment of the voltage stated.

Since various modifications can be made in our invention as hereinabove described and many apparently widely different embodiments of same made within the scope of the claims without departing from such spirit and scope, it is intended that all matter contained in the accompanying specification shall be interpreted as illustrative only and not in a limiting sense and we desire only such limitations placed thereon as are specifically expressed in the accompanying claims.

What we claim as our invention is:

1. In the art of electric arc welding, an automatic electrically operated visor shutter and associated mechanism for operating said shutter, comprising an electrically energized element adjacent said shutter and connected to a source of electromotive force capable of moving said shutter into and out of eye shielding position, a relay connected to a source of electromotive force, a welding electrode connected to said relay, a grounded welding table, current flowing through said element to cause the closing of said shutter upon application of said electrode to said table, and means in said relay for delaying the completion of a circuit of arc welding voltage until said shutter has been moved into eye shielding position.

2. In the art of electric arc welding, an automatic electrically operated visor shutter and associated mechanism for operating said shutter, comprising an electrically energized element adjacent said shutter and connected to a source of electromotive force capable of moving said shutter into and out of eye shielding position, a relay connected to a source of electromotive force and including an initial solenoid and a primary solenoid, said element being in series with said initial solenoid, a welding electrode connected to said relay, a grounded welding table, current flowing through said element to cause the closing of said shutter upon application of said electrode to said table and means in said relay including said initial solenoid for delaying the completion of a circuit of arc welding voltage until said shutter has been moved into eye shielding position.

3. In the art of arc welding, an automatic electrically operated visor shutter and associated mechanism for operating said shutter comprising an electrically energized element adjacent said shutter and connected to a source of electromotive force capable of moving said shutter into and out of eye shielding position, a relay connected to a source of electromotive force, said relay including at least a primary solenoid, said element being in parallel with said primary solenoid, a welding electrode connected to said relay, a grounded welding table, current flowing through said element to cause the closing of said shutter upon application of said electrode to said table and means in said relay for delaying the passage of current of arc welding voltage through said primary solenoid until said shutter has been moved into eye shielding position.

4. In the art of arc welding, a visor shutter, a shutter solenoid connected to said shutter and capable of moving the same upon the passage of current therethrough, said shutter being movable between eye shielding and eye exposing positions, a relay connected to a source of electromotive force, said relay comprising an initial solenoid, a primary solenoid, an armature and contacts, at least one contact capable of being moved by said initial solenoid, a welding electrode connected to said relay, a grounded welding table, current flowing through said shutter solenoid to cause the closing of said shutter upon application of said electrode to said table, and also through said initial solenoid to act upon one of said contacts and delay a passage of current of arc welding voltage through said primary solenoid until said shutter has been moved into eye shielding position.

5. In the art of arc welding, a visor shutter, a shutter solenoid connected to said shutter, said solenoid being connected to a source of electromotive force and being capable of moving the shutter upon the passage of current therethrough, said shutter being movable between eye shielding and eye exposing positions, a relay also connected to said source of electromotive force, said relay comprising an initial solenoid, a primary solenoid, an armature and contacts, at least one contact capable of being moved by said initial solenoid, said initial and shutter solenoids being connected in series with respect to said source of electromotive force, said shutter and primary solenoids being connected in parallel with respect to said source of electromotive force, a welding electrode connected to said relay, a grounded welding table, current flowing through said shutter solenoid to cause the closing of said shutter upon application of said electrode to said table and also through said initial solenoid to act upon one of said contacts and delay a passage of current of arc welding voltage through said primary solenoid until said shutter has been moved into eye shielding position.

WALTER B. ZIMMERMAN.
WILLIAM A. MARTIN.
JOSEPH CHISIK.